United States Patent [19]

Moran

[11] 3,890,615

[45] June 17, 1975

[54] TARGET DETECTION SYSTEM

[75] Inventor: Michael James Moran, Balerno, Scotland

[73] Assignee: Microwave and Electronic Systems Ltd., Newbridge, Scotland

[22] Filed: Oct. 30, 1972

[21] Appl. No.: 301,921

[30] Foreign Application Priority Data
Nov. 2, 1971  United Kingdom............... 50937/71

[52] U.S. Cl............................... 343/5 PD; 343/8 R
[51] Int. Cl................................................. G01s 9/44
[58] Field of Search ......... 343/5 PD, 8 R, 767, 770, 343/7.7, 771; 340/258 A, 258 B

[56] References Cited
UNITED STATES PATENTS

| | | | |
|---|---|---|---|
| 2,834,014 | 5/1958 | Thorne ............................... | 343/771 |
| 2,911,644 | 3/1959 | Stavis...................................... | 343/8 |
| 3,012,211 | 12/1961 | Mason ................................ | 343/7.7 |
| 3,242,486 | 3/1966 | Corbell .............................. | 343/8 X |
| 3,286,260 | 11/1966 | La Var Howard.............. | 343/771 X |
| 3,629,707 | 12/1971 | Baba et al........................ | 340/770 X |
| 3,697,993 | 10/1972 | Jones et al. .......................... | 343/7.7 |

OTHER PUBLICATIONS
Andrew Corp., Bulletin 1042A, June 1971.

Primary Examiner—Benjamin A. Borchelt
Assistant Examiner—H. J. Tudor
Attorney, Agent, or Firm—Sughrue, Rothwell, Mion, Zinn and Macpeak

[57] ABSTRACT

An intruder alarm system detects intruders by irradiating a space to be protected and detecting the Doppler-shift in signals returned by a moving intruder. A distributed antenna arrangement is used for both transmission and reception and provides a large aperture with low intensity local field. The antenna arrangement is a radiating transmission line or a number of discrete antennas coupled to a non-radiating line.

2 Claims, 6 Drawing Figures

PATENTED JUN 17 1975 3,890,615
SHEET 1

TARGET DETECTION SYSTEM

This invention relates to a target detection system using the Doppler effect to detect the movement of a target. The invention finds particular application in the field of intruder alarms.

Figure 1:
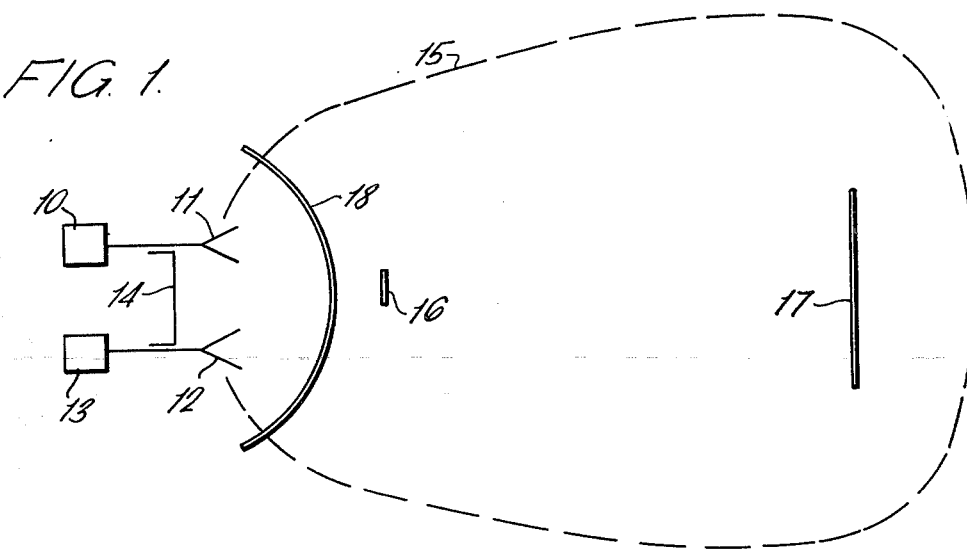

In order to detect intruders it has been proposed to irradiate a space to be protected with microwave energy and to detect reflected or scattered energy for the presence of Doppler-shift components indicating a moving target in the protected space. FIG. 1 of the accompanying drawings illustrates a problem which arises in an intruder system. The space to be protected is irradiated by an R.F. transmitter 10 operating in the microwave region and coupled to an aerial 11. Side-by-side with aerial 11 is a receiver aerial 12 coupled to a receiver 13 including detector and alarm-indicating circuitry. A proportion of the transmitter energy is fed by a coupling 14 to the receiver to act as a local oscillator signal which is mixed with the received signals for detection of Doppler-shift components in the received radiation. The coverage pattern (polar diagram) of the system is illustrated (not to scale) by the broken line 15. It will be appreciated that when a system is used indoors operating at a frequency of say 10 GHz multiple reflection and scattering from walls, fixed objects etc., greatly modifies the free space polar diagram of the system.

In this system, a high field intensity exists adjacent the aerials and the basic polar diagram of the system is fixed.

The nature of the field set up by the system is that a small moving target 16 (insect, small rodent) near to the aerials can produce a Doppler-shift signal in the receiver equivalent to that produced by a much larger target 17 (i.e., a man) at a greater distance; and unless precautions are taken a false intruder alarm results. Alternatively a blocking effect may result also giving a false alarm. A radome 18 may be used to limit the approach of small targets to the aerials 11, 12 but to keep signal returns from them to a sufficiently low level requires a large and bulky radome. Proposals have also been made for including in the detection circuitry 13 means for discriminating against insects and such like on the basis of the nature of the Doppler-shifted signals which they tend to produce. However, there is always a risk of a false alarm arising and in a security system it is clearly desirable to seek ways to reduce the risk to the minimum possible without adversely affecting the performance of the system when a real intruder is present.

Furthermore, the space coverage of a given transmitter/receiver unit may be restricted by fixed objects in the space to be protected behind which "shadow" areas of low field intensity are formed. Also the multiple reflections and scatterings mentioned above give rise to a standing wave pattern with its attendant areas of low and high field strength. A number of units may be required to adequately cover the protected space.

The present invention is generally directed towards providing a target detection system, particularly for an intruder alarm, in which the disadvantages of the above-described system are at least substantially mitigated. The local high field intensity in the immediate vicinity of the aerials of the system of FIG. 1, and its attendant problems, are avoided to a substantial extent by using a distributed antenna arrangement which effectively radiates power from a relatively large aperture thereby reducing the local field intensity as compared with that from a single antenna of small aperture. A further advantage of the distributed antenna arrangement is that it can be designed or tailored to fit the space to be protected and avoid shadow areas.

One target detection system of the invention comprises a wave energy generator; a distributed antenna arrangement coupled to the generator for energising thereby to radiate a proportion of the energy supplied to the antenna arrangement; and a receiver coupled to the antenna arrangement to receive therefrom non-radiated energy and signals exhibiting Doppler-shift returned to the antenna arrangement from a moving target irradiated thereby. The receiver is adapted by provision of an appropriate mixer or detector circuit to derive a Doppler-shift signal from the received signals. When used in an intruder alarm the Doppler-shift signal is processed to give a warning or alarm to indicate the presence of an intruder in the space monitored by the system.

The distributed antenna arrangement may be realised in the form of a radiating transmission line or a plurality of discrete antennas coupled at intervals along a non-radiating transmission line. This leads to flexibility in adapting the layout of the line and thus the distribution of the radiated field to the shape and requirements of the space to be protected as will be better appreciated from embodiments of the invention described below.

The wave energy with which the system operates may be either pressure wave, such as ultrasound, or radio frequency particularly in the V.H.F. and higher portion of the electromagnetic spectrum. The described embodiments will assume the use of radio frequency energy.

Figure 2:
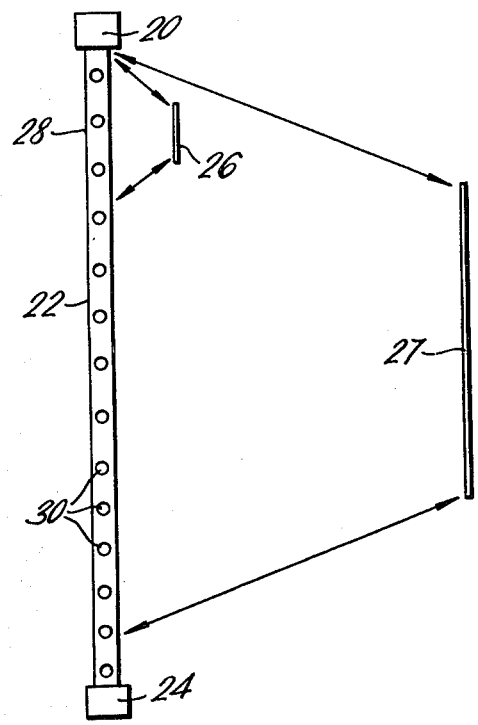
Figure 3:
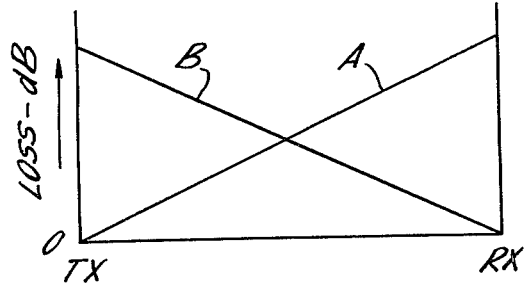
Figure 6:
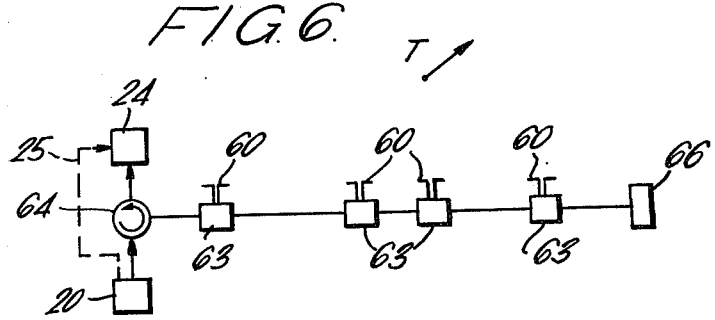
Figure 4:
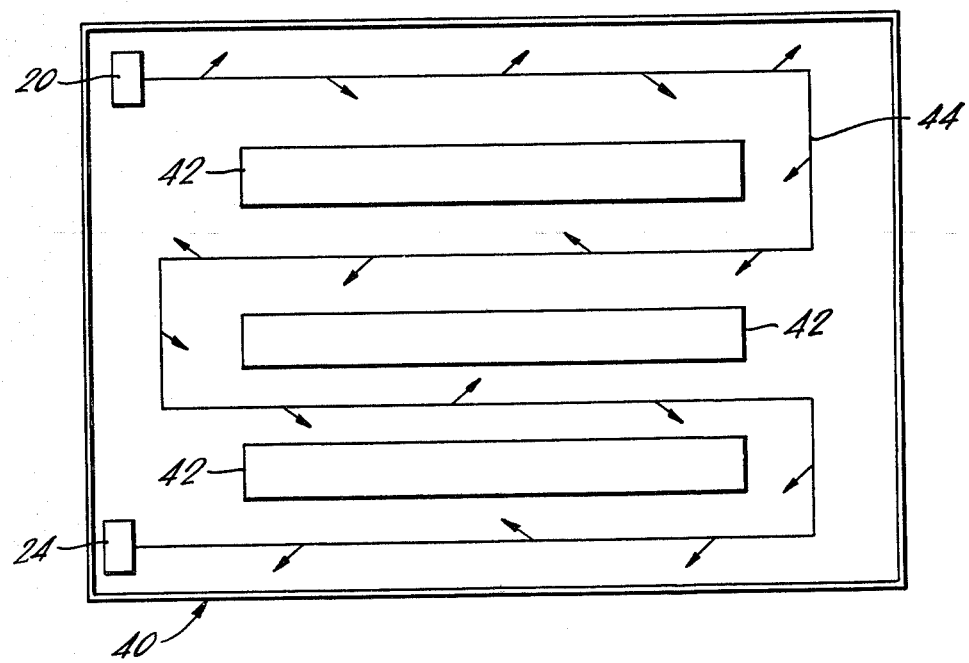
Figure 5:
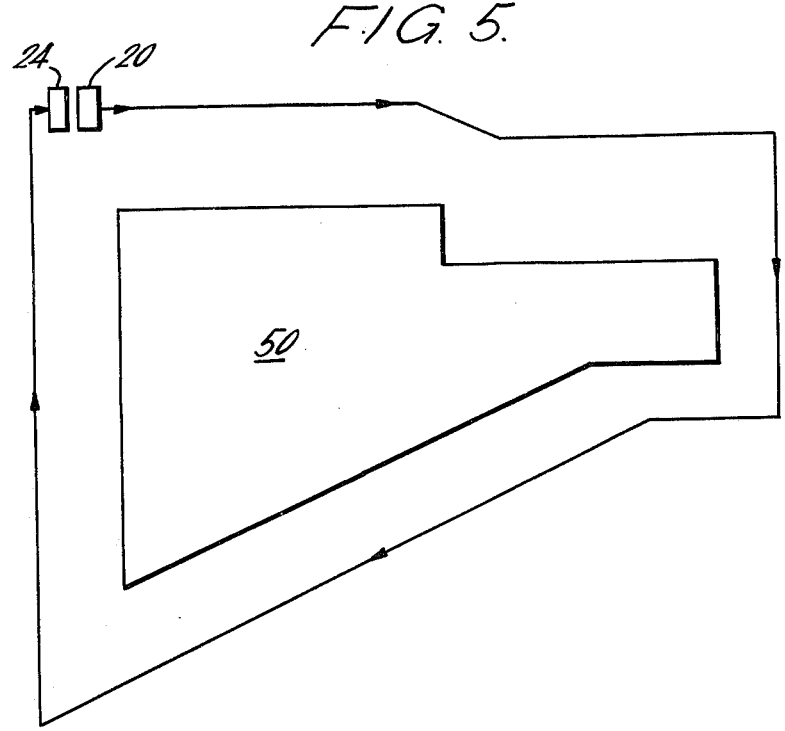

The invention and its preferred features will be better understood from the following more detailed description taken in conjunction with FIGS. 2 to 6 of the accompanying drawings in which:

FIG. 1 illustrates the prior art;
FIG. 2 illustrates a system of the invention;
FIG. 3 is a graph illustrating one aspect of the performance of the system of FIG. 2;
FIG. 4 is an illustration of one indoor application of the system to provide a coverage "tailored" to the needs of the space to be protected;
FIG. 5 is an illustration of an outdoor application of the system to provide a "tailored" coverage; and
FIG. 6 shows another system of the invention in which discrete antennas are used and the generator and receiver are coupled to the same end of the line.

Referring to FIG. 2 there is shown an R.F. generator 20 connected to one end of a transmission line 22 at the other end of which is connected a receiver 24 designed to detect Doppler-shift and including an appropriate mixer or detector circuit to this end as is well known to those skilled in the art. The received target signals exhibit Doppler-shift and may be termed the Doppler-shifted signals. The signal derived in the receiver after detection is herein called the Doppler-shift signal i.e., the signal at much lower frequency which contains the Doppler-shift components of the Doppler-shifted signal. The generator can operate anywhere in the radio frequency spectrum but conveniently would operate in the V.H.F., U.H.F. or S.H.F. range, say 100 to 10,000 MHz. The transmission line 22 can be pair line, coaxial cable, waveguide or micro-strip line selected in accordance with the frequency of operation, the requirements of installation etc. The space in the vicinity of the line 22 is irradiated by leakage of R.F. energy from the line. The line exhibits reciprocity and picks up energy returned to it by reflection or scattering from targets 26, 27 (shown very diagrammatically) irradiated by the leakage energy.

A pair line or micro-strip line may be designed to have sufficient natural leakage for this purpose. With a coaxial cable or waveguide which naturally screens the energy supplied to it the line should be apertured at intervals along its length to allow leakage from the line or even provided with a continuous, narrow slot to this end. A series of regular apertures 30 is shown by way of example in FIG. 2. A suitable apertured coaxial line is that available under the trade name "Radiax" from the Andrew Corporation. Another suitable radiating cable is that available from Kabel-und Metallwerke Gutehoffnungshutte AG of Germany and known as AHF cable. The line 22 acts as an extended radiator and the local intensity near the line is much smaller than near the transmitting aerial 11 of FIG. 1 which radiates the whole transmitter power from a relatively small aperture.

The target 26 is a small object moving near the line 22. It receives appreciable radiation from the apertures along only a comparatively short section 28 of the line and provides a useable Doppler-shift signal return only to section 28. The target 27 is a larger moving object further from the line. It receives significant radiation from the apertures in a much longer section of the line and returns energy to the larger number of apertures. Thus by providing, in effect, a large, low intensity, transmitting and receiving aperture, the signal level from a large target away from the effective aperture relative to that from a small target near the effective aperture is expected to be greater than would be obtained at the same ranges in the FIG. 1 system.

A certain amount of non-radiated power will reach the receiver 24 directly from the generator 20 through the line 22. This power provides the "local oscillator" for the receiver corresponding the power provided by coupling 14 in FIG. 1. There will be a power loss going from the transmitter to the receiver end of line 22 dependent on the power radiated in leakage and the transmission loss in the line. The power radiated per unit length of the cable depends on the number of apertures per unit length and the size of the apertures. This characteristic is shown as curve A in FIG. 3, from which it will be appreciated that the local field intensity at line apertures at the receiver end (RX) of the line is less than that at the transmitter end (TX). In compensation for this curve B shows how the signals picked up near the receiver end will suffer less attenuation in reaching the receiver than those picked up at the transmitter end. As the receiver signal is a combination of these two curves a substantially flat response will be obtained wherever a target is positioned along the line 22 at a given distance from it.

Since the effective aperture of the system can be made very large problems of "shadowing" can be reduced and the system may be readily adapted to the needs of a particular space to be protected.

FIG. 4 illustrates internal space protection in a warehouse 40 containing racks or rows of shelving 42 on which goods are stored. With units of the kind illustrated in FIG. 1, a number of units would normally be required to cover all bays between the storage racks 42. In FIG. 4, transmitter 20 is located in one corner and is coupled to a Doppler-shift detecting receiver 24 in another corner by a length of radiating transmission line 44 of the kind already described extending through the warehouse bays, the cable being disposed over normal working height for example. The whole area is irradiated as diagrammatically illustrated by the arrows and of course the line 44 may be laid out in any path appropriate to the layout within the warehouse.

FIG. 5 illustrates an outdoor application of the invention providing perimeter protection of a building 50. The transmitter 20 is connected to the receiver 24 through a radiating transmission line 52 of the kind described, the line extending around the perimeter of the building 50. The line 52 may be run above ground or at lower frequencies may even be buried under the ground. Since the line runs in a closed loop the transmitter 20 and receiver 24 could be accommodated in a single unit.

A single transmitter could be arranged to feed more than one transmission line each protecting a specific area and each terminated with its own receiver.

The transmission line may be used for transmitting other signals from sensors used in a more complex security system and coupled into the line at convenient points.

Another system embodying the invention is shown in FIG. 6. The system uses a plurality of discrete antennas 60 (four being shown by way of example) which are coupled at intervals along a non-radiating transmission line 62 such as an ordinary coaxial cable. Radio frequency energy is fed to one end of the line 62 from a generator 20 and the placing of the antennas is selected in accordance with the requirements of the space to be protected. That is to say the line 62 may be bent and the aerials 60 located to provide coverage to meet the configuration of the space shown in FIG. 4 for example.

Although an antenna 60 is likely to have overlapping coverage with one or more adjacent antennas, the antennas can be considered basically as radiating separately and are not combined as in an array to provide a predetermined resultant radiation pattern such as a narrow beam. In a similar way to the radiating transmission line, since each antenna 60 has fed to it only a fraction of the total power required to irradiate the whole space, the local field in the vicinity of each antenna is kept low. The radiating line embodiment can be considered as a number of spaced radiator portions which overlap in their coverage (see FIG. 2) but do not combine their radiation in the manner of an antenna array.

In both the discrete antenna and radiating line arrangements, the Doppler-shifted signals at the receiver are likely to be complex. This may be illustrated by further reference to FIG. 6 where T represents a target moving in the direction shown by the arrows. The target T is in many cases separately irradiated by two and probably more of the antennas 60, say the three antennas to the right as seen in the figure. The target will reflect or scatter radiation with Doppler-shift the amount of which, for the radiation from each antenna, is a function of the radial velocity component of the target from that antenna. Thus doppler-shifted signals having different shifts will be produced and in many cases the signals will return to two or more of the antennas so that each picks up some Doppler-shifted component due to radiation not only from itself but also from an adjacent antenna. The Doppler-shifted signals combine at the receiver 24 in a complex manner giving a spectrum of Doppler frequencies detected thereby. The same situation arises with a radiating line where one section picks up Doppler-shifted signals due to radiation of a target from an adjacent section.

FIG. 6 also shows how the receiver 24 and generator 20 can be coupled to the same end of a line such as 22 or 62 by use of a circulator 64 by which each is coupled to the line but is decoupled from the other. The "local oscillator" energy for the receiver in this case can be obtained by a further coupling 25 shown in dashed line between the generator 20 and receiver 24 or alternatively by providing a termination 66 at the other end of the line 62 which is a mismatch to the line impedance and which, therefore, reflects energy back down the line, which reflected energy is coupled into receiver 24 through circulator 64 along with the signals picked up by antennas 60. The termination 66 may be an open or short circuit or a lossy termination chosen to control the level of non-radiated generator energy fed to the receiver. It is preferred to have uniform power fed to each of the antenna 60 from the different coupling points along the line at which different power levels exist, and each antenna is coupled to the line by a coupling means 63 which gives the desired degree of coupling for that antenna.

The embodiments described above are designed for security applications and to this end the receiver 24 preferably includes a threshold level circuit and a circuit for counting or averaging the cycles of the detected Doppler-shift signal so that in effect no alarm is given unless a sufficient magnitude of signal is picked up by the antenna arrangement and a sufficient degree of intruder movement occurs. Such circuits are described in German Offenlegunsschrift 2,035,435.

What is claimed is:

1. A target detection system for detecting the presence of a moving target in a monitored space comprising a generator of wave energy; a distributed antenna arrangement comprising a radiative transmission line for radiating a proportion of wave energy applied thereto, one end of said transmission line being coupled to said generator for energization thereby to radiate a proportion of the energy supplied to said antenna arrangement, said antenna arrangement being distributed along a path extending through said monitored space and different portions of said antenna arrangement irradiating a portion of said space in the immediate vicinity thereof whereby the radiated energy is distributed through said space at low intensity; and a receiver coupled to another end of said transmission line to receive therefrom signals exhibiting Doppler-shift returned to said antenna arrangement from a moving target irradiated thereby, and receive non radiated energy supplied to said antenna arrangement by said generator and being responsive thereto and to said Doppler-shifted signals to derive a Doppler-shift signal indicative of the presence of a moving target.

2. A system as claimed in claim 1 wherein said radiative transmission line is a flexible line.

* * * * *